United States Patent
Kurosawa

(10) Patent No.: US 6,693,733 B2
(45) Date of Patent: Feb. 17, 2004

(54) POLYGONAL MIRROR FIXING DEVICE

(75) Inventor: Hironori Kurosawa, Nagano (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 0 days.

(21) Appl. No.: 10/007,777

(22) Filed: Nov. 15, 2001

(65) Prior Publication Data

US 2002/0085294 A1 Jul. 4, 2002

(30) Foreign Application Priority Data

Nov. 16, 2000 (JP) ........................................ 2000-349990

(51) Int. Cl.⁷ .......................... G02B 26/12; G02B 7/182
(52) U.S. Cl. .................... 359/198; 359/197; 359/216; 359/217; 359/850; 359/855
(58) Field of Search ................... 359/197, 198, 359/216, 217, 218, 219, 850, 855; 347/261, 257; 235/462.39, 462.4, FOR 105

(56) References Cited

U.S. PATENT DOCUMENTS

| | | | | |
|---|---|---|---|---|
| 4,523,800 A | * | 6/1985 | Yamashita et al. | 359/200 |
| RE33,721 E | * | 10/1991 | Sato et al. | 359/198 |
| 5,325,006 A | * | 6/1994 | Uno et al. | 310/90 |
| 5,642,150 A | * | 6/1997 | Takahashi | 347/257 |
| 5,661,588 A | * | 8/1997 | Ishizuka et al. | 359/216 |
| 5,666,219 A | * | 9/1997 | Ishizuka et al. | 359/200 |
| 5,933,267 A | * | 8/1999 | Ishizuka | 359/200 |
| 6,031,650 A | * | 2/2000 | Suzuki et al. | 359/198 |
| 6,087,749 A | * | 7/2000 | Ishizuka | 310/91 |
| 6,400,485 B2 | * | 6/2002 | Kashiwada et al. | 358/200 |
| 2002/0021477 A1 | * | 2/2002 | Fukita et al. | 359/200 |

FOREIGN PATENT DOCUMENTS

| | | | | |
|---|---|---|---|---|
| JP | 63-131120 A | * | 6/1988 | |
| JP | 02-170113 | * | 6/1990 | |
| JP | 04-25814 A | * | 1/1992 | |
| JP | 05-181082 A | * | 7/1993 | |
| JP | 10-10455 A | * | 1/1998 | |
| JP | 2000-131638 | | 5/1998 | |
| JP | 2000-347119 A | * | 12/2000 | |

\* cited by examiner

Primary Examiner—John Juba
(74) Attorney, Agent, or Firm—Reed Smith LLP

(57) ABSTRACT

A polygonal mirror fixing device comprising a rotary body, to which a polygonal mirror is adapted to be mounted, has a mounting circumferential surface in a center opening of the polygonal mirror and a mounting bottom surface which projects from the mounting circumferential surface in the radially outward direction. A mirror pressing member which is composed of the same material as the polygonal mirror is positioned to have contact with an axial end surface of the polygonal mirror, the other side from the end surface the contacts the mounting bottom surface. A mirror fixing member and a spring member are attached axially to the other side of the mirror pressing member to press the mirror pressing member in the axial direction. By the pressing force of the mirror fixing member in the axial direction, the mirror pressing member is pressed in the axial direction toward the mounting bottom surface so that the polygonal mirror is fixed.

4 Claims, 2 Drawing Sheets

POLYGONAL MIRROR FIXING DEVICE

CROSS-REFERENCE TO RELATED APPLICATIONS

This application claims priority of Japanese Application No. 2000-349990, filed Nov. 16, 2000, the complete disclosure of which is hereby incorporated by reference.

BACKGROUND OF THE INVENTION a) Field of the Invention

The present invention relates to a polygonal mirror fixing device in which a polygonal mirror placed over a rotary body is fixed by the press-fitting of a mirror fixing member via a spring member.

b) Description of the Related Art

In general, a polygonal mirror fixing device, in which a polygonal mirror is placed around a rotary body, is formed integral with a motor 1, as illustrated in FIGS. 2 and 3. A polygonal mirror 4 is axially placed over a rotary seat 3 of a cylindrical shape with a step, which is a part of a rotor 2 of the motor 1. More specifically, a center opening of the polygonal mirror 4 is axially placed over a mounting circumference 3a of the rotary seat 3; in the figure, the bottom end of the polygonal mirror 4 contacts a mounting bottom surface 3b which extends in the radially outward direction from the mounting circumference 3a.

In the figure, an outer periphery of a mirror fixing member 5 attached and fixed to the mounting circumference 3a of the rotary seat 3 is pressed toward the top end surface of the polygonal mirror 4 via a spring member 6. With the pressing force of the mirror fixing member 5 and the spring member 6 in the axial direction, the polygonal mirror 4 is axially pressed toward the mounting bottom surface 3a, and whereby the polygonal mirror 4 is fixed.

Thus, the center opening of the polygonal mirror 4 is placed over the mounting circumference 3a of the rotary seat 3. A predetermined clearance is provided between the center opening of the polygonal mirror 4 and the mounting circumference 3a of the rotary seat 3 so that an excessive force will not be applied to deform the polygonal mirror 4 when the mounting circumference 3a of the rotary seat 3 passes through the center opening of the polygonal mirror 4. Therefore, the mirror fixing member 5 presses the polygonal mirror 4 toward the mounting bottom surface 3b of the rotary seat 3 with resilience via the spring member 6; by the pressing force and the friction caused due to the pressing, the polygonal mirror 4 is fixed.

OBJECT AND SUMMARY OF THE INVENTION

However, while a ferrous material is generally used for the spring member 6, an aluminum material is generally used for the polygonal mirror 4. Thus, the polygonal mirror 4 is fixed as the members having different coefficients of linear expansion are in contact. Consequently, when the ambient temperature changes, the dimension is changed differently between the members 4 and 6, especially, in the radial direction. This causes a relative displacement in the radial direction between the members 4 and 6. Also the center of gravity of the polygonal mirror 4 is shifted from the center of rotation, and whereby rotational vibrations may be caused.

Accordingly, a primary object of the present invention is to provide a polygonal mirror fixing device of a simple configuration in which a displacement of the polygonal mirror that normally occurs due to the change in the ambient temperature can be prevented in order to obtain a steady rotation.

In accordance with the present invention, the above object is achieved by providing a polygonal mirror fixing device in which a rotary body to which a polygonal mirror is mounted has a mounting circumferential surface and a mounting bottom surface. The mounting circumferential surface is in a center opening of the polygonal mirror and said mounting bottom surface projecting from the mounting circumferential surface in the radially outward direction and having contact with an axial end surface of the polygonal mirror. A mirror fixing member and a spring member are attached axially from the outside of the polygonal mirror to the mounting circumferential surface of the rotary body, and by the pressing force of the mirror fixing member in the axial direction, the polygonal mirror is pressed in the axial direction toward the mounting bottom surface so that the polygonal mirror is fixed to the rotary body; wherein a mirror pressing member composed of the same material as the polygonal mirror is positioned such that it has contact with an axial end surface of the polygonal mirror, the other side from the end surface that contacts the mounting bottom surface; the mirror fixing member is attached axially to the outer side of the mirror pressing member to press the mirror pressing member in the axial direction; and by the pressing force of the mirror fixing member in the axial direction, the mirror pressing member is pressed in the axial direction toward the mounting bottom surface so that the polygonal mirror is fixed.

In other words, according to the polygonal mirror fixing member having the above configuration, the mirror pressing member that directly contacts the polygonal mirror is composed of the same material as the polygonal mirror. Therefore, the polygonal mirror is fixed such that the members having the same coefficient of linear expansion are in contact with each other. Consequently even when the ambient temperature changes, causing the diameter of the polygonal mirror to increase or decrease, there is no relative displacement in the radial direction between both members. Thus, the center of gravity of the polygonal mirror is always in accordance with the center of rotation to obtain a continuous, smooth rotation.

Also, since the mirror pressing member is fixed to the fitting surface of the mounting circumference of the rotary body in such a way as not to move at least in the radial direction, a displacement of the mirror pressing member in the radial direction is prevented from occurring.

Further, according to the polygonal mirror fixing member in accordance with the invention, the mirror fixing member is attached to the fitting surface and also positioned to contact the mirror pressing member via the spring member; by the pressing force of the mirror fixing member in the axial direction via the spring member, the mirror pressing member is pressed in the axial direction. In addition to the above effect, the polygonal mirror is pressed with resilience.

Further, according to the polygonal mirror fixing member in accordance with the invention, the outer diameter of the fitting portion which is provided at the rotary body for attaching the mirror pressing member is formed smaller than the outer diameter at the mirror mounting circumferential surface of the rotary body. Consequently the mirror fixing member which is attached to the fitting portion to press the mirror pressing member is not necessarily formed larger, but one having a smaller diameter can be used to give a resilient pressing effect. Thus, the entire device can be smaller at low cost.

Further, in the polygonal mirror fixing device of the present invention, the mirror pressing member is fixed by press-fitting to the fitting portion of the rotary body; thus, the mirror pressing member can be fixed very easily.

Further, in the polygonal mirror fixing device of the present invention, the mirror fixing member is coaxially fitted to the fitting portion of the rotary body from the axial direction. This makes the assembling process efficient.

DESCRIPTION OF THE PREFERRED EMBODIMENTS

An embodiment of a polygonal mirror driving device which has a polygonal mirror fixing device of the present invention is described hereinafter based on the drawings.

Figure 1:
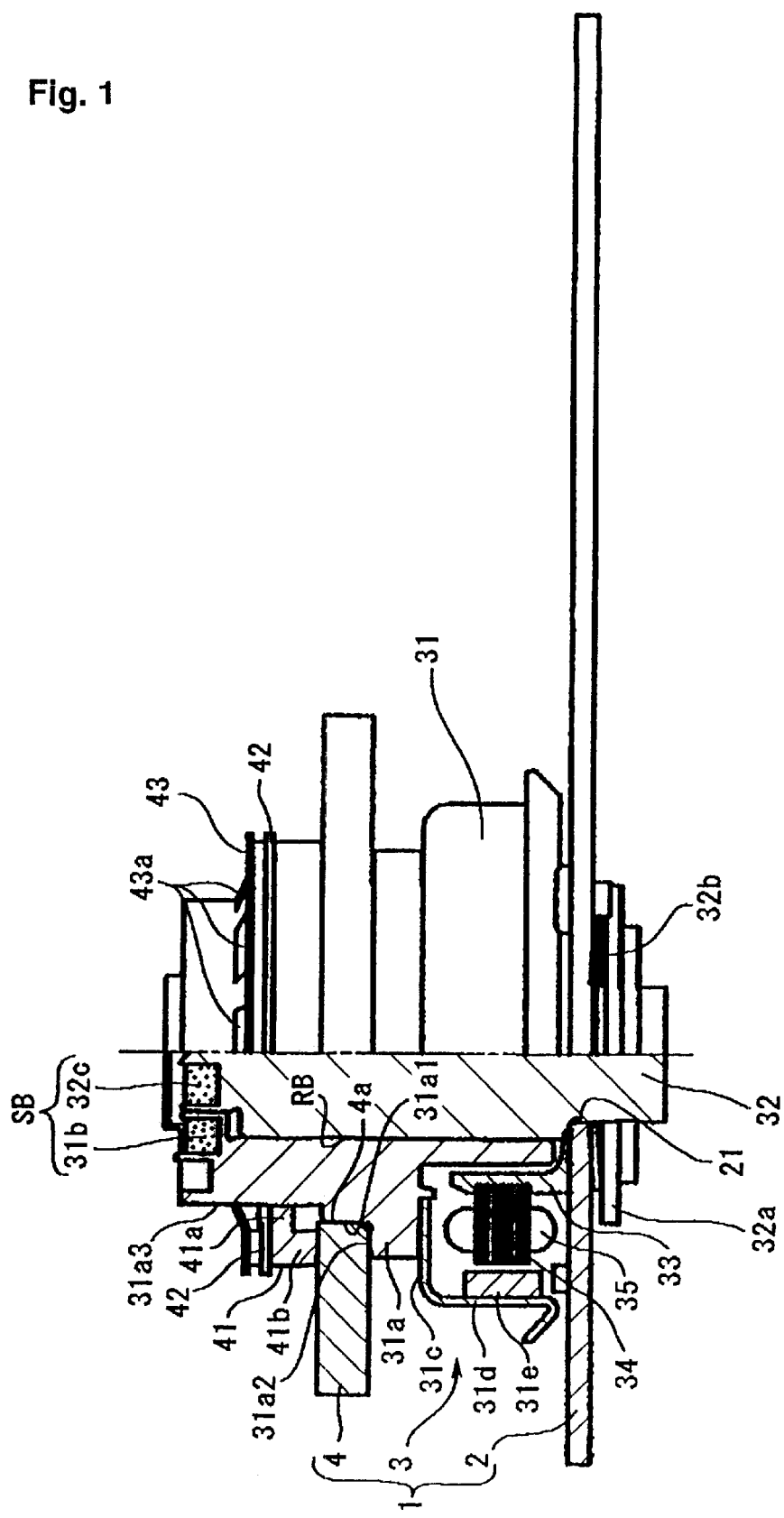
FIG. 1 is a half cross-sectional diagram of a mirror drive motor which is equipped with a polygonal mirror fixing device of an embodiment of the present invention.
Figure 2:
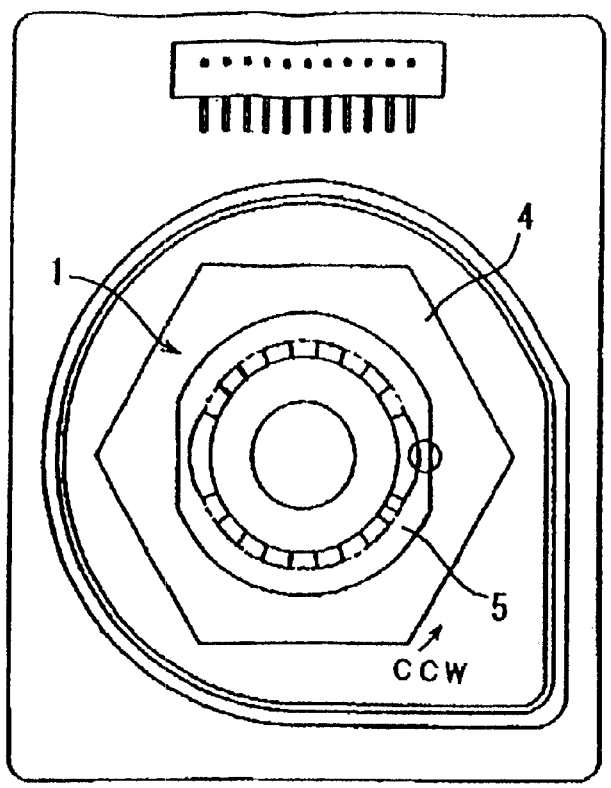
FIG. 2 is a plan view of a mirror drive motor which is equipped with a conventional polygonal mirror fixing device.
Figure 3:
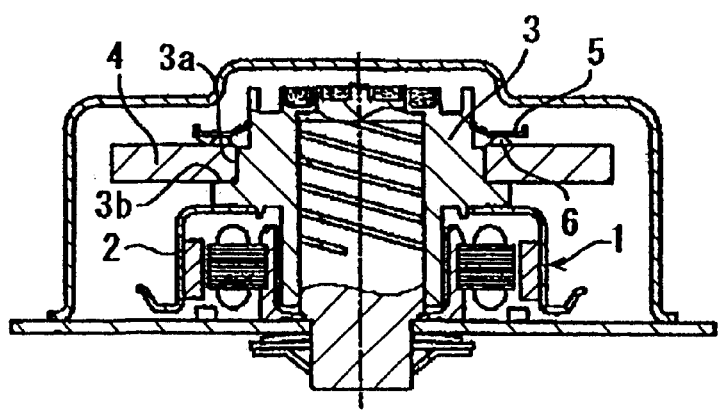
FIG. 3 is a cross-sectional diagram of the mirror drive motor which is equipped with the conventional polygonal mirror fixing device illustrated in FIG. 2.

As illustrated in FIG. 1, a polygonal mirror driving device 1 of this embodiment comprises of a motor 3 configured on a steel base 2 and a polygonal mirror 4 mounted on a rotor 31 of the motor 3. The motor 3 and the polygonal mirror 4 are entirely covered and protected from particles and noise by a case.

A connector (not illustrated) is soldered on the steel base 2 to provide the output for the drive signals to the motor 3. A base end of a fixed shaft 32 of the motor 3 is fitted into and passes through a shaft fixing opening 21 bored in the steel base 2. The fixed shaft 32 is perpendicularly fixed to the steel base 2 by a push-nut 32a, and a flat spring 32b is sandwiched between the steel base 21 and the push-nut 32a. The flat spring 32b absorbs vibrations from the fixed shaft 32 so that the push-nut is kept from becoming loose.

Also fixed on the steel base 2 is a hollow cylindrical core holder 33. A stator core 34 composed of a laminated electromagnetic steel is attached to the cylindrical outer circumference of the core holder 33. A drive coil 35 is wound around each salient pole of the stator core 34. In the figure, the innermost periphery of the core holder 33 at the bottom end is configured to engage with a recess formed in the fixed shaft 32. When the bottom end surface of the core holder 33 is placed on the steel base 2 and then the push-nut 32a and the flat spring 32b are attached, the innermost periphery of the core holder 33 at the bottom end is sandwiched between the recess portion in the fixed shaft 32 and the steel base 2 to fix the core holder 33.

Also, the rotary seat portion 31a of the rotor 31 is rotatably attached to the fixed shaft 32. In other words, a radial dynamic pressure bearing RB is provided between the outer circumference of the fixed shaft 32 and the inner circumference of the center opening of the rotary seat 31a to generate a dynamic pressure in the air in the gap therebetween so that the entire rotor 31a is supported in the radial direction. A surface treatment such as a polyamide imide resin coating is applied to the outer circumference of the fixed shaft 32 to improve the wear resistance and the burn resistance. In the surface of the polyamide imide resin coating layer, herringbone- or spiral-configured dynamic pressure generating grooves (not illustrated) are cut by machining. Consequently, as the rotor 31 is rotated, a dynamic pressure is generated in the air in the gap between the outer circumference of the fixed shaft 32 and the center opening inner circumference of the rotary seat 31a to support the rotary seat 31a freely with respect to the fixed shaft 32.

Also a thrust bearing SB is configured using a magnetic force generated between a magnet 32c placed at the top end portion of the fixed shaft 32 and a magnet 31b placed at the top end portion of the rotary seat 31a of the rotor 31. A pair of the magnets 32c and 31b are opposed to each other with different poles to generate a magnetic force that holds the entire rotor 31 in an axially predetermined position with respect to the fixed shaft 32.

A shallow dish-like rotor case 31c is fixed by caulking to the rotary seat 31a of the rotor 31 to extend from the rotary seat 31a in the radially outward direction. A ring-like rotor magnet 31e is attached to an inner circumference of an upright wall yoke 31d formed at the outer circumference of the rotor case 31c such that it approaches close to both of the salient-poles of the stator core 34 from the outer side in the radial direction.

Further, a mounting circumferential surface 31a1 and a mounting bottom surface 31a2, which together form a step, are formed on the outer circumference of the rotary seat 31a of the rotor 31. The step portion is used for supporting a mirror. Then a plane hexagonal polygonal mirror 4 which is composed of an aluminum or an aluminum alloy is attached to the mirror. In other words, a center opening 4a of the polygonal mirror 4 is placed over the mounting circumferential surface 31a1 of the rotary seat 31a with an appropriate gap (clearance). Consequently, when the center opening 4a of the polygonal to the polygonal mirror 4, and therefore, a problem such as a deformation of the mirror is prevented from occurring.

The mounting bottom surface 31a2 extends in the radially outward direction from the bottom periphery of the mounting circumferential surface 31a1, providing a larger diameter portion to the rotor 31 to create a protruded step portion. The bottom end of the polygonal mirror 4 is supported by the mounting bottom surface 31a2. Also, a fitting surface 31a3 is created at the rotary seat 31a to define the smaller diameter portion of the rotor 31, and thus a recessed step is created in the mounting circumferential surface mirror 4 is placed over the mounting circumferential surface 31a1, an excessive force will not be applied e 31a1 in the upper end. A mirror pressing member 41 is attached to the fitting surface 31a3 of smaller diameter.

The mirror pressing member 41 is a shallow dish-like member composed of an aluminum or an aluminum alloy, which is the same material as the polygonal mirror 4. An opening in the center of a circular plate portion 41a, which is the bottom surface of the mirror pressing portion 41, is press-fitted to the fixing surface 31a3 of the rotary seat 31a. In other words, the mirror pressing member 41 is press-fitted to the fitting surface 31a3, i.e., the rotary seat 31a, in such a way as not to move at least in the radial direction.

A cylindrical outer circumferential wall 41b of the mirror pressing member 41, which is provided at the outer periphery of the mirror pressing member, is positioned to pressingly contact the top end surface of the polygonal mirror 4, that is, the other side from the end surface that contacts the mounting bottom surface 31a2. By the pressing force of the mirror pressing member in the axial direction, the polygonal mirror 4 is pressed toward the mounting bottom surface 31a2.

A ring-like mirror fixing member 43 and a spring member 42 are attached from the top of the mirror pressing member 41 to the fitting surface 31a3. On the inner circumferential periphery of the mirror fixing member 43, a plurality of nails 43a that project toward the center are provided. As each of the nails 43a is engaged with each of the engagement grooves (not illustrated) in the fitting surface 31a3 of the rotary seat 31a while being resiliently deformed, the mirror fixing member 43 is fixed to the rotary seat 31a. As the pressing force of the mirror fixing member 43 and the spring member 42 in the axial direction is transmitted to the polygonal mirror 4 via the mirror pressing member 41, the polygonal mirror 4 is completely kept from moving in the axial direction.

Thus, in the polygonal mirror fixing device of this embodiment, the mirror pressing member 41, which directly contacts the polygonal mirror 4, is composed of the same material as the polygonal mirror 4. That is, the polygonal mirror 4 is fixed such that the members 4 and 41 having the same coefficient of linear expansion are directly in contact with each other. With this, even when the ambient temperature changes, causing the diameter of the polygonal mirror 4 to increase or decrease, there will be no relative displacement in the radial direction between the members 4 and 41. Hence, the center of gravity of the polygonal mirror 4 is the same as the center of rotation, and the polygonal mirror 4 rotates continuously and smoothly, thus preventing vibrations which may be caused in a conventional polygonal mirror.

Also, according to the polygonal mirror fixing device of this embodiment, the outer diameter of the fitting portion 31a3 of the rotary seat 31a, which is provided for attaching the mirror pressing member 41, is smaller than the mounting bottom surface 31a2. This enables the mirror fixing member 43 and the spring member 42, which press the mirror pressing member 41, to employ ones of small diameter. Consequently the entire device can be manufactured small at low cost.

Further, according to the polygonal mirror fixing device of this embodiment, the mirror pressing member 41 is press-fitted to the fitting portion 31a3 of the rotary seat 31a. Therefore, the mirror pressing member 41 is kept from moving in the radial direction with respect to the fitting portion 31a3, and can be fixed very easily.

Furthermore, according to the polygonal mirror fixing device of this embodiment, the mirror fixing member 43 and the spring member 42 are coaxially fitted to the fitting portion 31a3 of the rotary seat 31a. This assembling process can be efficient.

Although the embodiment of the invention by the present inventor(s) has been described in detailed, the present invention is not limited to this. It is needless to say that the present invention can be variously modified within the scope of the invention.

For example, although the mirror pressing member 41 is fixed by press-fitting in the above embodiment, different kinds of fixing means such as bonding, caulking, welding, etc. can be used. Note that it is essential to keep the mirror pressing member 41 from moving in the radial direction with respect to the fitting portion 31a3.

Also, the mirror pressing member 41 is of a shallow dish-type in the above embodiment; however, other shapes such as a simple flat type can also be employed.

As described above, in the polygonal mirror fixing device of this invention, the mirror pressing member, which directly contacts the polygonal mirror to set the polygonal mirror, is composed of the same material as the polygonal mirror. Thus, the polygonal mirror is assembled such that the members having the same coefficient of linear expansion are in contact with each other. With this, even when the ambient temperature changes, causing the diameter of the polygonal mirror to increase or decrease, there will no relative displacement in the radial direction between the mirror and the pressing member. Consequently, the center of gravity of the polygonal mirror and the center of rotation are kept in agreement for a smooth rotation. Thus, the device can be made simple and vibrations are prevented from occurring even when the temperature changes. This improves reliability of the polygonal mirror fixing device.

Furthermore, in the polygonal mirror fixing device of this invention, the mirror fixing member attached to the fitting surface of the rotary body is pressed in the axial direction via the spring member to fix the polygonal mirror. Thus, the polygonal mirror is pressed with resilience. Therefore, a good fixing condition of the polygonal mirror can be obtained.

In the polygonal mirror fixing device of this invention, the outer diameter at the fitting portion of the rotary body for attaching the mirror pressing member is made of a smaller diameter. At the same time, the mirror fixing member and the spring member, which press the mirror pressing member, are also formed of a smaller diameter. Thus, the device can be manufactured smaller at low cost.

In the polygonal mirror fixing device of this invention, the mirror pressing member is fixed by press-fitting to the fitting portion of the rotary body to facilitate the process of fixing the mirror pressing member. Thus, the productivity can be increased.

In the polygonal mirror fixing device of this invention, the mirror fixing member and the spring member are co-axially fitted to the fitting portion of the rotary body, making the assembling process efficient. Thus, the productivity can be increased.

While the foregoing description and drawings represent the present invention, it will be obvious to those skilled in the art that various changes may be made therein without departing from the true spirit and scope of the present invention.

What is claimed is:

1. A polygonal mirror fixing device comprising:
   a rotary body, to which the polygonal mirror is adapted to be mounted between a mounting circumferential surface and a mounting bottom surface,
   said mounting circumferential surface being in a center opening of said polygonal mirror and said mounting bottom surface projecting from said mounting circumferential surface in the radially outward direction to form a step for having press-fit contact with an axial end surface of said polygonal mirror;
   a mirror fixing member and a spring member being attached axially from the outside of the polygonal mirror to said mounting circumferential surface of the rotary body;
   wherein, by the pressing force of said mirror fixing member in the axial direction, said polygonal mirror is pressed in the axial direction toward said mounting bottom surface so that said polygonal mirror is fixed to said rotary body by press-fitting against said mounting bottom surface of said step;
   a mirror pressing member composed of the same material as said polygonal mirror so that the same coefficient of linear expansion exists between said mirror pressing member and said polygonal mirror;

said mirror pressing member being positioned to have contact with an axial top end surface of said polygonal mirror, said mirror pressing member being rigid and having a flat planar surface formed in a radial direction to press against and contact said top end surface of said polygonal mirror to press-fit the polygonal mirror between said mirror pressing member and said mounting bottom surface of said step so that the polygonal mirror will not move radially;

said mirror fixing member being attached axially to the outer side of said mirror pressing member to press the mirror pressing member in the axial direction; and wherein, by the pressing force of said mirror fixing member in the axial direction, said mirror pressing member is pressed in the axial direction toward said mounting bottom surface so that said polygonal mirror is fixed; and wherein a fitting portion in said mounting circumferential surface of said rotary body has a smaller diameter than an outer diameter of said portion of said mounting circumferential surface to which said polygonal mirror is attached, and said mirror pressing member includes a circular plate portion fixed to said mounting circumferential surface of said rotary body and an outer circumferential wall portion which projects in the axial direction from an outer circumference of said circular plate portion and contacts an end surface of said polygonal mirror.

2. The polygonal mirror fixing device as set forth in claim 1 wherein said mirror fixing member is attached to a fitting surface and also positioned to have contact with said mirror pressing member via a spring member so that with a pressing force of said mirror fixing member in the axial direction via said spring member, said mirror pressing member is pressed in the axial direction.

3. The polygonal mirror fixing device as set forth in claim 1 wherein said circular plate portion of said mirror pressing member is fixed by press-fitting to said fitting portion of said rotary body.

4. The polygonal mirror fixing device as set forth in claim 1 wherein said mirror fixing member is layered in the axial direction and placed in order, over a fitting portion of said rotary body for fixing.

* * * * *